(12) United States Patent
Shrestha et al.

(10) Patent No.: US 12,120,718 B2
(45) Date of Patent: Oct. 15, 2024

(54) SPECTRAL REGION IDENTIFICATION FOR REFERENCE SYMBOL

(71) Applicant: Telefonaktiebolaget LM Ericsson (publ), Stockholm (SE)

(72) Inventors: Deep Shrestha, Linköping (SE); Åke Busin, Sollentuna (SE); Sara Modarres Razavi, Linköping (SE); Iana Siomina, Täby (SE); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 637 days.

(21) Appl. No.: 17/290,853

(22) PCT Filed: Nov. 6, 2018

(86) PCT No.: PCT/SE2018/051134
§ 371 (c)(1),
(2) Date: May 3, 2021

(87) PCT Pub. No.: WO2020/096502
PCT Pub. Date: May 14, 2020

(65) Prior Publication Data
US 2021/0385820 A1    Dec. 9, 2021

(51) Int. Cl.
*H04W 72/542* (2023.01)
*H04W 64/00* (2009.01)

(52) U.S. Cl.
CPC ......... *H04W 72/542* (2023.01); *H04W 64/00* (2013.01)

(58) Field of Classification Search
CPC .... H04W 72/542; H04W 64/00; H04L 5/0092
See application file for complete search history.

(56) References Cited

U.S. PATENT DOCUMENTS

| | | |
|---|---|---|
| 10,098,088 B1 | 10/2018 | Kumar et al. |
| 2002/0154608 A1 | 10/2002 | Chockalingam et al. |

(Continued)

FOREIGN PATENT DOCUMENTS

| | | |
|---|---|---|
| CN | 105794255 A | 7/2016 |
| CN | 106664591 A | 5/2017 |

(Continued)

OTHER PUBLICATIONS

"NR beam management supporting multi-gNB measurements for positioning", 3GPP TSG RAN WG1 Meeting #95, R1-1813583, Spokane, US, Nov. 12-16, 2018, pp. 1-8.

(Continued)

*Primary Examiner* — Eric Myers
(74) *Attorney, Agent, or Firm* — Murphy, Bilak & Homiller, PLLC

(57) ABSTRACT

The invention relates to a method for operating a user equipment (QQ1 10) in a wireless network, the method comprising measuring radio characteristics of a first set of physical resources, the first set of physical resources being available for receiving downlink reference signals for positioning (RSa-RSc) and the first set of physical resources being indicated by a first message (S21 1) received from a network node (QQ160), selecting a second set of physical resources from the first set of physical resources based on the measured radio characteristics, sending a second message (S122), indicative of the selected second set of physical resources to the network node (QQ160).

18 Claims, 12 Drawing Sheets

(56) References Cited

U.S. PATENT DOCUMENTS

| | | |
|---|---|---|
| 2007/0281642 A1 | 12/2007 | Gorokhov |
| 2016/0065342 A1 | 3/2016 | Mirbagheri et al. |
| 2016/0242052 A1 | 8/2016 | Kazmi et al. |
| 2017/0171857 A1 | 6/2017 | Lee et al. |
| 2017/0238298 A1 | 8/2017 | Wang et al. |
| 2018/0139763 A1 | 5/2018 | Bitra et al. |

FOREIGN PATENT DOCUMENTS

| | | |
|---|---|---|
| RU | 2237361 C2 | 9/2004 |
| RU | 2419232 C2 | 5/2011 |
| WO | 2013070166 A1 | 5/2013 |
| WO | 2016122812 A1 | 8/2016 |
| WO | 2018104864 A1 | 6/2018 |
| WO | 2018168670 A1 | 9/2018 |

OTHER PUBLICATIONS

"Discussion on Possible Techniques for NR Positioning", 3GPP TSG RAN WG1 Meeting #94bis, R1-1810315, Chengdu, China, Oct. 8-12, 2018, pp. 1-7.

Fischer, Sven , "Observed Time Difference Of Arrival (OTDOA) Positioning in 3GPP LTE", Qualcomm Technologies, Inc., https://www.qualcomm.com/media/documents/files/otdoa-positioning-in-3gpp-lte.pdf, Jun. 6, 2014, pp. 1-62.

SPECTRAL REGION IDENTIFICATION FOR REFERENCE SYMBOL

TECHNICAL FIELD

The invention relates to a method for operating a user equipment, UE, in particular for localization of the UE. The invention further relates to a method for a user equipment, a network node and a user equipment.

BACKGROUND

Localization of user equipment (UE) has been one of many important features of LTE since 3GPP Rel. 9. Due to the regulatory requirements, a precise identification of the E911 calls origin has also been considered as one prime feature that the new radio (NR) technology should support.

To support user equipment, UE, positioning, typical system architectures have been proposed respectively for LTE and NR. In LTE positioning architecture, LTE positioning protocol (LPP) and radio resource control (RRC) protocol are respectively devised to handle the interactions between a UE and location server (E-SMLC) and between the eNodeB and UE. In addition, an LTE positioning protocol A (LPPa) has been defined as an interaction protocol between the E-SMLC and the eNodeB. Moreover, in NR, the interaction between the gNodeB and location server (LMF) is handle by NR positioning protocol A (NRPPa) and the interaction between the UE and gNodeB is handled by the RRC protocol. However, the interaction protocol between the LMF and the UE remains to be defined in NR specification standardization work.

Currently, enhanced cell ID (E-CID), global navigation satellite system (GNSS) assisted, observed time difference of arrival (OTDOA) and uplink time difference of arrival (UTDOA) based technologies are exploited or used for UE positioning. Depending on the localization accuracy, OTDOA has been widely accepted as one of the major positioning techniques for LTE, and is also considered for upcoming Rel. 16 study item for NR positioning, among the above-mentioned other technologies.

To facilitate better accuracy of OTDOA based positioning, positioning reference signals (PRS) or downlink reference signals for positioning have been introduced in the NR specification, also with a muting pattern. The muting pattern advocates PRS transmissions following a specific physical or time-frequency resource allocation such that a UE can also listen to a faraway located cell and perform time of arrival (TOA) estimation using the PRS when closer located cells are muted or not transmitting on those specific physical or time-frequency resources. Exploiting the estimated TOA from a reference cell and the neighboring cells, the UE feedbacks received signal time difference of arrival (RSTD) measurements to the location server. The location server after receiving the RSTD measurements performs OTDOA to estimate the UE location.

A problem with conventional systems is that the TOA estimation and RSTD measurement heavily depends on the channel behavior at the frequency band where the PRS transmission is performed as the reference signal/PRS transmission is static, and being transmitted in a predefined time-frequency grid pattern.

Another problem is that the channel bandwidth which may be very large in NR compared to LTE and performing a single timing measurement over the large BW may not provide good results.

Thus, there is a need for an improved method performed by a network node.

OBJECTS OF THE INVENTION

An objective of embodiments of the present invention is to provide a solution which mitigates or solves the drawbacks described above.

SUMMARY OF THE INVENTION

The above and further objectives are achieved by the subject matter described herein. Further advantageous implementation forms of the invention are described herein.

According to a first aspect of the invention, the above mentioned objectives are achieved by a method for operating a user equipment in a wireless network, the method comprising measuring radio characteristics of a first set of physical resources, the first set of physical resources being available for receiving downlink reference signals for positioning and the first set of physical resources being indicated by a first message received from a network node, selecting a second set of physical resources from the first set of physical resources based on the measured radio characteristics, sending a second message, indicative of the selected second set of physical resources to the network node.

At least one advantage of this aspect of the disclosure is that positioning quality of the UE is improved, as the physical resources potentially used are the physical resources perceived as the best or preferred by the UE. Further advantages include that reference symbol, e.g. PRS, transmission is performed by exploiting the part of the spectrum where the channel condition is good between the UE and radio node link. A further advantage is that, as the reference symbol configuration now relies on the UE measurements, a UE specific reference symbol configuration is achieved. A further advantage is that resource allocation is based on the channel measurements, hence a dynamic exploitation of the available resources is achieved.

According to a second aspect of the invention, the above mentioned objectives are achieved by a method for operating a network node in a wireless network.

According to a third aspect of the invention, the above mentioned objectives are achieved by a method for operating a location server in a wireless network.

According to a fourth aspect of the invention, the above mentioned objectives are achieved by a user equipment configured to perform the method according to the first aspect.

According to a fifth aspect of the invention, the above mentioned objectives are achieved by a network node configured to perform the method according to the second aspect.

According to a sixth aspect of the invention, the above mentioned objectives are achieved by a server configured to perform the method according to the third aspect.

According to a seventh aspect of the invention, the above mentioned objectives are achieved by a computer program comprising computer-executable instructions for causing a user equipment, when the computer-executable instructions are executed on a processing unit comprised in the user equipment, to perform any of the method steps according to the first aspect.

According to an eighth aspect of the invention, the above mentioned objectives are achieved by a computer program comprising computer-executable instructions for causing a network node, when the computer-executable instructions are executed on a processing unit comprised in the network node, to perform any of the method steps according to the second aspect.

According to a ninth aspect of the invention, the above mentioned objectives are achieved by a computer program comprising computer-executable instructions for causing a server, when the computer-executable instructions are executed on a processing unit comprised in the server, to perform any of the method steps according to the third aspect.

According to a tenth aspect of the invention, the above mentioned objectives are achieved by a computer program product comprising a computer-readable storage medium, the computer-readable storage medium having the computer program according to the seventh, eighth or ninth aspect embodied therein.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
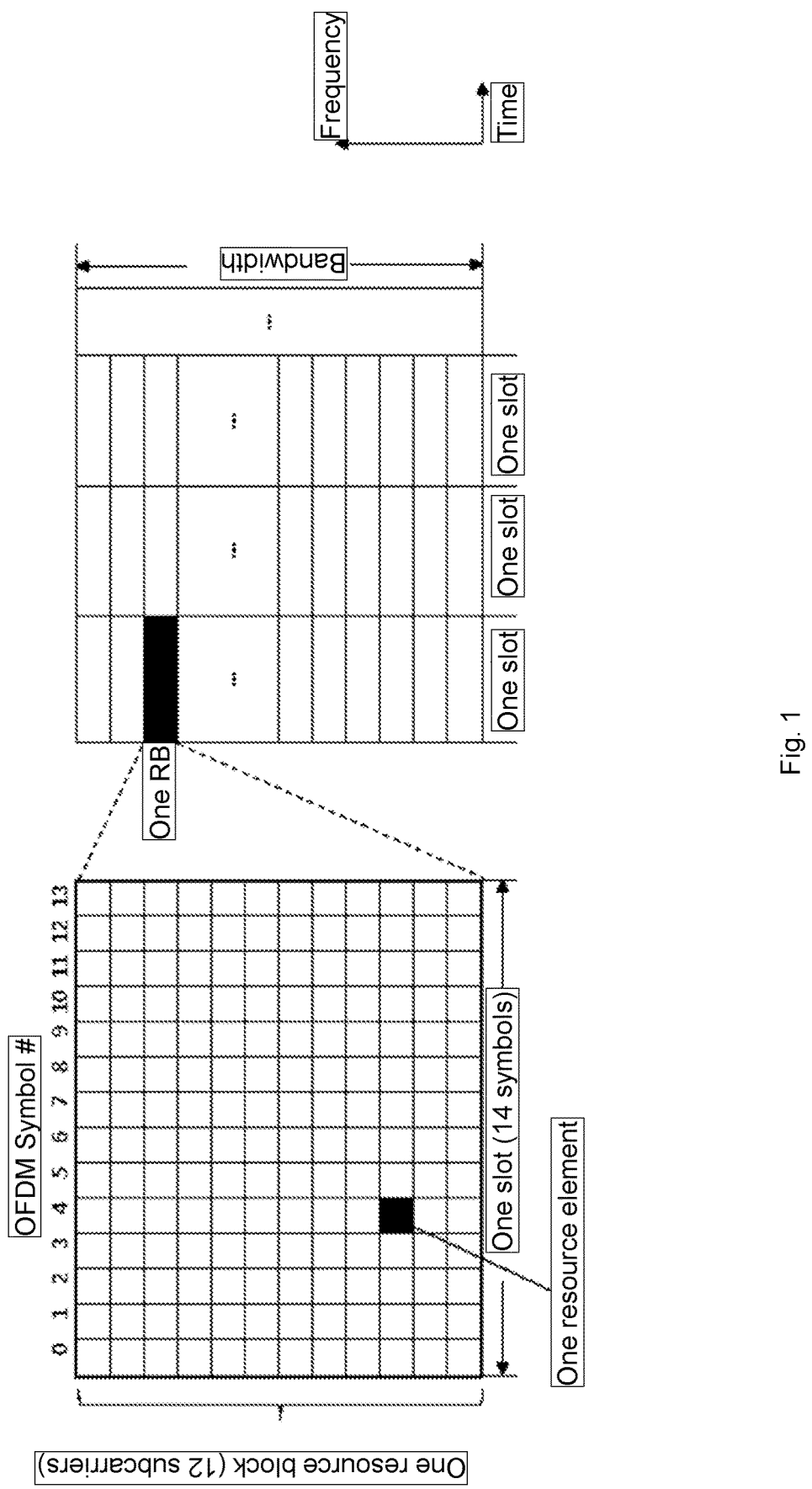
FIG. 1 illustrates a time-frequency grid according to one or more embodiments of the present disclosure.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The present disclosure is disclosed in the context of next generation mobile wireless communication system (5G) or new radio (NR), but it is understood that the teaching herein is not limited thereto.

As used herein, the term "wireless device" (WD) is used interchangeably with "user equipment" (UE) and refers to a device capable, configured, arranged and/or operable to communicate wirelessly with network nodes and/or other wireless devices. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As used herein, the term "network node" refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

As used herein, the term "radio characteristics" refers to measured physical characteristics of one or more physical resources, e.g. time/frequency resources and/or signal/antenna beams, forming a channel for transmitting a radio/wireless signal, e.g. transmitting a message between nodes of a wireless network. Examples of measured radio characteristics are Channel Quality Indicator (CQI), Reference Signal Received Power (RSRP), Reference Signal Received Quality (RSRQ), and Carrier Received Signal Strength Indicator (RSSI). In one example, a measurement of channel quality represents Signal to Interference plus Noise Ratio (SINR). In one example, a measurement of RSSI measures the average received power observed only in OFDM symbols containing reference symbols at a particular antenna port. In one example, a measurement of RSRP measures the average received power from a single Reference signal. In one example, a measurement of RSRQ measures a relation between RSRP and RSSI, e.g. RSRP/RSSI.

As used herein, the term "downlink reference signals for positioning" refers to a predetermined sequence comprised in a wireless signal and being transmitted using physical resources. In one example, "downlink reference signals for positioning" refers to Positioning Reference Signal, PRS. In on example, a UE estimates the exact time offsets between PRS received from different cells.

In this disclosure, a novel mechanism to configure reference symbol, e.g. PRS, transmission for each cell based on the UE's channel experience is proposed. Unlike in the conventional approach where the PRS configuration is defined for each cell without considering the effect of channel on the TOA estimation, the proposed method exploits the UE reported channel measurements and a PRS configuration based on the reported measurements to enhance TOA estimation accuracy for OTDOA positioning.

The core essence of the solution resides on the fact that a best spectral region is identified based on the UE's perspective about the channel condition and the reference signal transmission for positioning is configured in that region. Moreover, a dynamic configuration of reference signal for positioning is achieved that can in turn enhance the positioning measurement, e.g. time of arrival TOA estimation for OTDOA based positioning.

The basic NR physical resource can thus be seen as a time-frequency grid as illustrated in FIG. 1, where each resource element, RE, corresponds to one OFDM subcarrier during one OFDM symbol interval. Resource allocation in a slot is described in terms of frequency resources, i.e. resource blocks (RBs) in the frequency domain, and number of time resources, i.e. OFDM symbols in the time domain. A RB may e.g. correspond to 12 contiguous subcarriers and a slot consists of 14 OFDM symbols.

Different subcarrier spacing values are supported in NR. The supported subcarrier spacing values (also referred to as numerologies) in NR are given by $\Delta f=(15\times 2^{\alpha})$ kHz where $\alpha$ is a non-negative integer.

Figure 2:
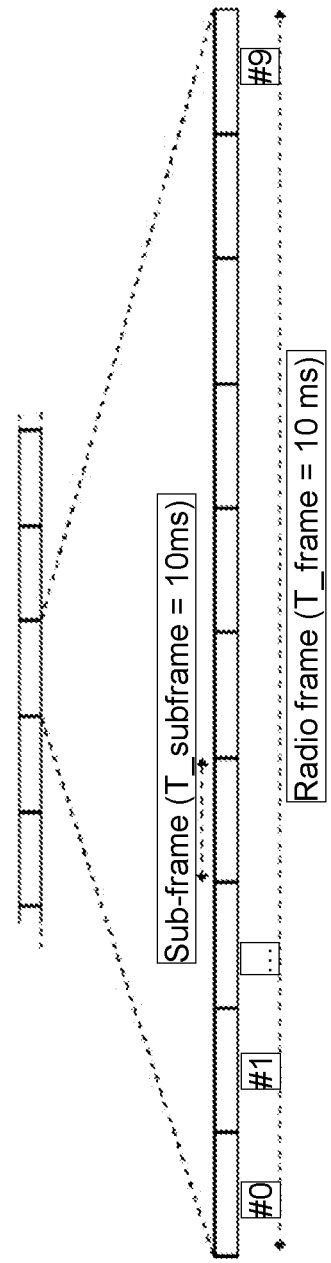
FIG. 2 illustrates sub frames according to one or more embodiments of the present disclosure.

In the time domain, downlink and uplink transmissions in NR are organized into equally-sized subframes similar to LTE as shown in FIG. 2. A subframe is further divided into slots and the number of slot per subframe is $2^{\alpha+1}$ for a numerology of $(15\times 2^{\alpha})$ kHz.

NR supports "slot based" transmission. In each slot, the gNB transmits downlink control information (DCI), e.g. about which UE data is to be transmitted to and which resources in the current downlink slot the data is or will be transmitted on. The DCI is carried on the Physical Control Channel (PDCCH) and data is carried on Physical Downlink Shared Channel (PDSCH). This PDCCH is typically transmitted in control resource sets (CORESETs) in the first few OFDM symbols in each slot. A UE first decodes PDCCH and if a PDCCH is decoded successfully, it then decodes the corresponding PDSCH, e.g. carrying data, based on the decoded DCI in the PDCCH.

Uplink data transmissions are also dynamically scheduled using PDCCH. Similar to downlink transmissions, a UE first decodes a uplink grant in a UL DCI carried by PDCCH and then transmits data over the Physical Uplink Shared Channel (PUSCH), based the decoded control information in the UD DCI/uplink grant, such as modulation order, coding rate, uplink resource allocation, and etc.

Each UE is assigned with a unique C-RNTI (Cell Radio Network Temporary Identifier) during network connection. The CRC (cyclic redundancy check) bits attached to a DCI for a UE is scrambled by the UE's C-RNTI, so a UE recognizes its own DCI by checking the CRC bits of the DCI against the assigned C-RNTI.

Figure 3:
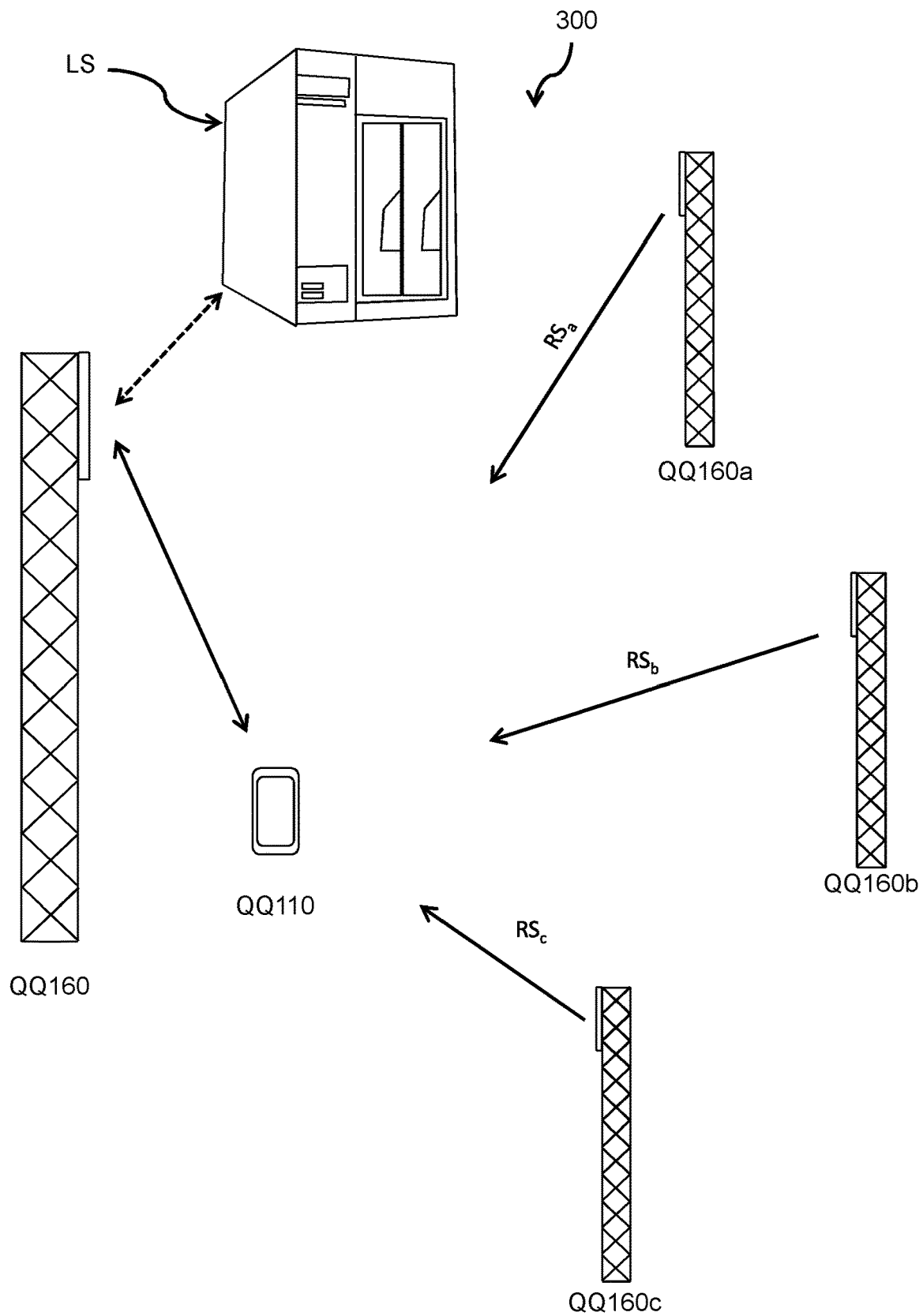
FIG. 3 illustrates a user equipment, network node and location server according to one or more embodiments of the present disclosure.

FIG. 3 illustrates a user equipment QQ110, network node QQ160 and location server LS according to one or more embodiments of the present disclosure. FIG. 3 further shows additional network nodes QQ160a-QQ160c. The user equipment, the network nodes and the location server communicates over a network or wireless network or wireless communications network 300. In practice, a wireless network may further include any additional elements suitable to support communication between different user equipment or between a user equipment and another communication device, such as a landline telephone, a service provider, or any other network node or end device. The wireless network 300 may provide communication and other types of services to one or more user equipment to facilitate the user equipment's access to and/or use of the services provided by, or via, the wireless network.

In one example scenario of the present disclosure, the user equipment QQ110 in the wireless network 300 measures radio characteristics of a first set of physical resources. The first set of physical resources being available for receiving downlink reference signals for positioning $RS_a$-$RS_c$, e.g. selected from a total predetermined set of physical resources. The first set of physical resources is indicated by a first message S211 received from the network node QQ160. The user equipment QQ110 then selects a second set of physical resources from the first set of physical resources based on the measured radio characteristics. The second set may e.g. be selected based on measured radio characteristics of each or a selection of physical resources comprised in the first set. The measured radio characteristics may e.g. be any combination of any of CQI, RSRP, RSRQ and RSSI. The user equipment QQ110 then sends a second message S122, indicative of the selected second set of physical resources to the network node QQ160.

In other words, the user equipment QQ110 selects or effectively recommends the second set of physical resources from first set of physical resources being available for receiving downlink reference signals for positioning to be used by the network node QQ160. The physical resources may e.g. be any combination of any of time resources, frequency resources, antenna beams and code resources.

This has at least the advantage of improving positioning quality of the UE, as the physical resources potentially used are the physical resources perceived as the best or preferred by the UE. Further advantages include that reference symbol, e.g. PRS, transmission is performed by exploiting the part of the spectrum where the channel condition is good between the UE and radio node link. A further advantage is that, as the PRS configuration now relies on the UE measurements, a UE specific PRS configuration is achieved. A further advantage is that resource allocation is based on the channel measurements, hence a dynamic exploitation of the available resources is achieved.

The wireless network 300 may comprise and/or interface with any type of communication, telecommunication, data, cellular, and/or radio network or other similar type of system. In some embodiments, the wireless network 300 may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 300 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and user equipment QQ110 may comprise various components further described in more detail below. These components work together in order to provide network node and/or user equipment functionality, such as providing wireless connections in a wireless network. In different embodiments, the wireless network may comprise any number of wired or wireless networks, network nodes, base stations, controllers, user equipment, relay stations, and/or any other components or systems that may facilitate or participate in the communication of data and/or signals whether via wired or wireless connections.

In one embodiment, the network node QQ160 includes a selection of any of processing circuitry, device readable medium, interface, auxiliary equipment, power source, power circuitry, and antenna. Although the network node QQ160 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, a network node may comprise multiple different physical components that make up a single illustrated component (e.g., device readable medium may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium for the different RATs) and some components may be reused (e.g., the same antenna may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry is configured to perform any determining, calculating, or similar operations (e.g., certain obtaining operations) described herein as being provided by a network node. These operations performed by processing circuitry may include processing information obtained by processing circuitry by, for example, converting the obtained information into other information, comparing the obtained information or converted information to information stored in the network node, and/or performing one or more operations based on the obtained information or converted information, and as a result of said processing making a determination.

Processing circuitry may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium, network node QQ160 functionality. For example, processing circuitry may execute instructions stored in device readable medium or in memory within processing circuitry. Such functionality may include providing any of the various wireless features, functions, or benefits discussed herein. In some embodiments, processing circuitry may include a system on a chip (SOC).

In some embodiments, processing circuitry may include one or more of radio frequency (RF) transceiver circuitry and baseband processing circuitry. In some embodiments, radio frequency (RF) transceiver circuitry and baseband processing circuitry may be on separate chips (or sets of chips), boards, or units, such as radio units and digital units. In alternative embodiments, part or all of RF transceiver circuitry and baseband processing circuitry may be on the same chip or set of chips, boards, or units In certain embodiments, some or all of the functionality described herein as being provided by a network node, base station, eNB or other such network device may be performed by processing circuitry executing instructions stored on device readable medium or memory within processing circuitry. In alternative embodiments, some or all of the functionality may be provided by processing circuitry without executing instructions stored on a separate or discrete device readable medium, such as in a hard-wired manner. In any of those embodiments, whether executing instructions stored on a device readable storage medium or not, processing circuitry can be configured to perform the described functionality. The benefits provided by such functionality are not limited to processing circuitry alone or to other components of network node, but are enjoyed by network node QQ160 as a whole, and/or by end users and the wireless network generally.

Device readable medium may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry. Device readable medium may store any suitable instructions, data or information, including a computer program, software, an application including one or more of logic, rules, code, tables, etc. and/or other instructions capable of being executed by processing circuitry and, utilized by network node QQ160. Device readable medium may be used to store any calculations made by processing circuitry and/or any data received via interface. In some embodiments, processing circuitry and device readable medium may be considered to be integrated.

Interface is used in the wired or wireless communication of signaling and/or data between network node QQ160, network, and/or UEs. As illustrated, interface comprises port(s)/terminal(s) send and receive data, for example to and from network over a wired connection. Interface also includes radio front end circuitry that may be coupled to, or in certain embodiments a part of, antenna. Radio front end circuitry comprises filters and amplifiers. Radio front end circuitry may be connected to antenna and processing circuitry. Radio front end circuitry may be configured to condition signals communicated between antenna and processing circuitry. Radio front end circuitry may receive digital data that is to be sent out to other network nodes or UEs via a wireless connection. Radio front end circuitry may convert the digital data into a radio signal having the appropriate channel and bandwidth parameters using a combination of filters and/or amplifiers. The radio signal may then be transmitted via antenna. Similarly, when receiving data, antenna may collect radio signals which are then converted into digital data by radio front end circuitry. The digital data may be passed to processing circuitry. In other embodiments, the interface may comprise different components and/or different combinations of components.

In certain alternative embodiments, network node QQ160 may not include separate radio front end circuitry, instead, processing circuitry may comprise radio front end circuitry and may be connected to antenna without separate radio front end circuitry. Similarly, in some embodiments, all or some of RF transceiver circuitry may be considered a part of interface. In still other embodiments, interface may include one or more ports or terminals, radio front end circuitry, and RF transceiver circuitry, as part of a radio unit, and interface may communicate with baseband processing circuitry, which is part of a digital.

Antenna may include one or more antennas, or antenna arrays, configured to send and/or receive wireless signals. Antenna may be coupled to radio front end circuitry and may be any type of antenna capable of transmitting and receiving data and/or signals wirelessly. In some embodiments, antenna may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna may be separate from network node QQ160 and may be connectable to network node QQ160 through an interface or port.

Antenna, interface, and/or processing circuitry may be configured to perform any receiving operations and/or certain obtaining operations described herein as being performed by a network node. Any information, data and/or signals may be received from a wireless device, another network node and/or any other network equipment. Similarly, antenna, interface, and/or processing circuitry may be configured to perform any transmitting operations described herein as being performed by a network node. Any information, data and/or signals may be transmitted to a wireless device, another network node and/or any other network equipment.

Power circuitry may comprise, or be coupled to, power management circuitry and is configured to supply the components of network node QQ160 with power for performing the functionality described herein. Power circuitry may receive power from power source. Power source and/or power circuitry may be configured to provide power to the various components of network node QQ160 in a form suitable for the respective components (e.g., at a voltage and current level needed for each respective component). Power source may either be included in, or external to, power circuitry and/or network node QQ160. For example, network node QQ160 may be connectable to an external power source (e.g., an electricity outlet) via an input circuitry or interface such as an electrical cable, whereby the external power source supplies power to power circuitry. As a further example, power source may comprise a source of power in the form of a battery or battery pack which is connected to, or integrated in, power circuitry. The battery may provide backup power should the external power source fail. Other types of power sources, such as photovoltaic devices, may also be used.

Alternative embodiments of network node QQ160 may include additional components that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (UE) refers to a device capable, configured, arranged and/or operable to communicate wirelessly with network nodes and/or other wireless devices.

Communicating wirelessly may involve transmitting and/or receiving wireless signals using electromagnetic waves, radio waves, infrared waves, and/or other types of signals suitable for conveying information through air. In some embodiments, a UE may be configured to transmit and/or receive information without direct human interaction. For instance, a UE may be designed to transmit information to a network on a predetermined schedule, when triggered by an internal or external event, or in response to requests from the network.

Examples of a UE include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A UE may support device-to-device (D2D) communication, for example by implementing a 3GPP standard for sidelink communication, and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as a machine-type communication (MTC) device.

As one particular example, the UE may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

Figure 4:
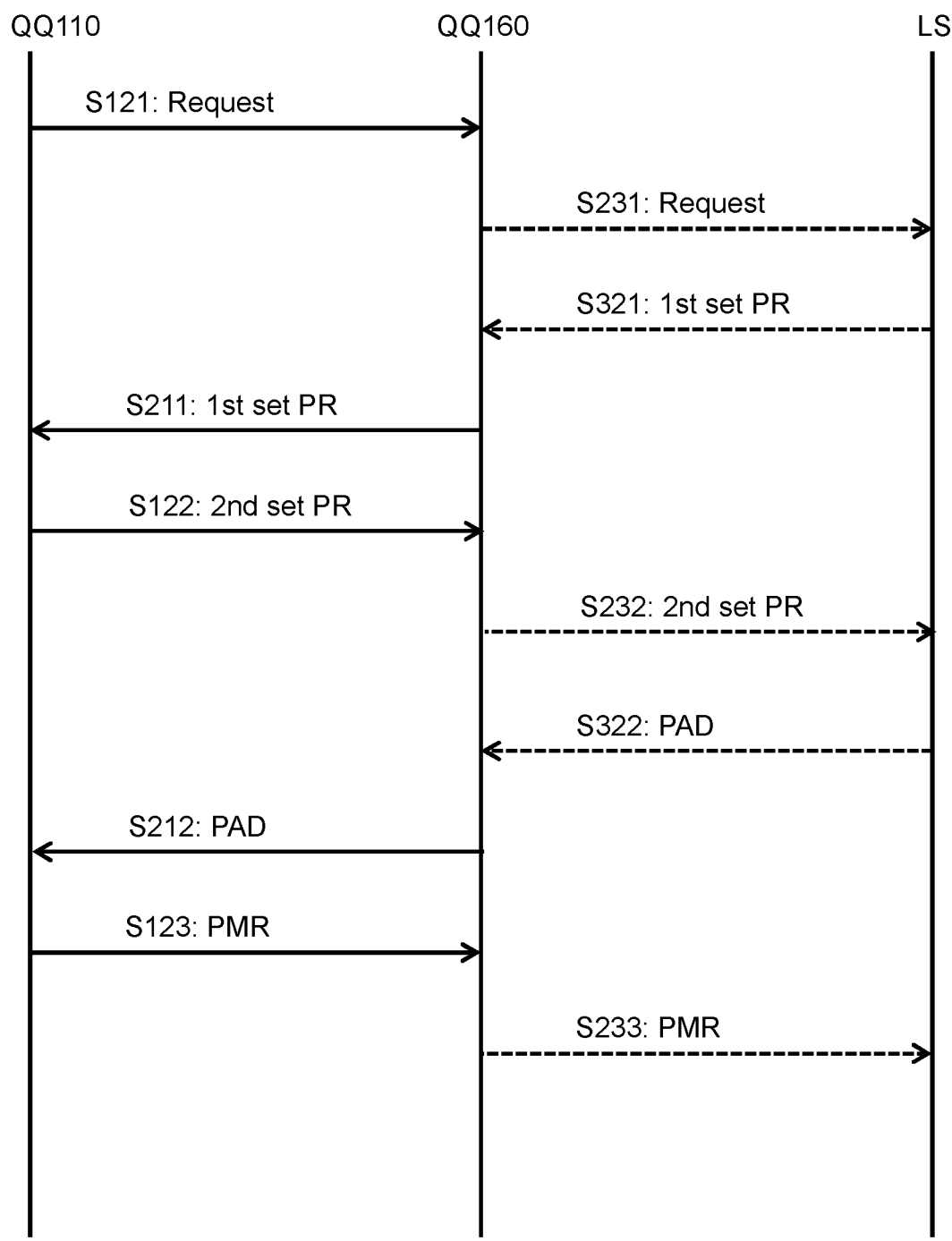
FIG. 4 shows a signaling chart according to one or more embodiments of the present disclosure.

FIG. 4 shows a signaling chart according to one or more embodiments of the present disclosure. The signaling chart shows signals and/or messages exchanged between the user equipment QQ110, the network node QQ160 serving the user equipment QQ110.

In one embodiment, a UE positioning event is initialized through transmission by the user equipment QQ110 or by second network node (not shown) by sending a message S121 indicative of a request for physical resources selectable for positioning of the UE to the network node QQ160. The second network node could e.g. be a Mobility Management Entity in LTE, an Access & Mobility Management Function entity, AMF, in NR, a gNB and/or a radio network node.

In one embodiment, the network node QQ160 identifies, decides or determines a first set of physical resources being available for receiving downlink reference signals for positioning. In one example, the first set of physical resources are predetermined or dynamically configured or agreed upon amongst network nodes of the wireless network. In this embodiment, the network node QQ160 receives the message S121 indicative of the request for physical resources selectable for positioning from the user equipment QQ110 or from the second network node. The network node QQ160 then determines the first set, e.g. by retrieving the first set as predetermined data from a memory. The network node QQ160 then transmits a message S211, indicative of the first set of physical resources, to the user equipment QQ110.

In one alternative embodiment, the location server decides or determines the first set of physical resources being available for receiving downlink reference signals for positioning. In this embodiment, the network node QQ160 receives the message S121 indicative of the request for physical resources selectable for positioning from the user equipment QQ110 or from the second network node. The network node QQ160 then transmits a message S231, indicative of the request, to the location server LS. The location server LS then determines the first set, e.g. by retrieving the first set of physical resources from memory. The location server LS then transmits a message S321, indicative of the first set of physical resources, to the network node QQ160. The network node QQ160 then transmits a message S211, indicative of the first set of physical resources, to the user equipment QQ110.

The user equipment QQ110 then measures radio characteristics of the first set of physical resources, e.g. as previously described. The first set of physical resources are typically physical resources being available and/or intended and/or dedicated for receiving downlink reference signals for positioning $RS_a$-$RS_c$. The first set of physical resources is, as previously described, indicated by the message S211 received from the network node QQ160.

The user equipment QQ110 then selects a second set of physical resources from the first set of physical resources based on the measured radio characteristics. E.g. by ranking the physical resources according to predetermined conditions and/or corresponding measured radio characteristics, e.g. according to strongest RSSI. The user equipment QQ110 then sends or transmits a message S122, indicative of the selected second set of physical resources, to the network node QQ160.

The network node QQ160 then receives the message S122, indicative of the second set of physical resources selected from the first set of physical resources, from the user equipment QQ110. The network node QQ160 then obtains (data indicative of) physical resources PAD for receiving downlink reference signals for positioning $RS_a$-$RS_c$. The physical resources PAD are typically obtained based on the selected second set of physical resources.

In one embodiment, the network node QQ160 then obtains the (data indicative of) physical resources PAD by selecting physical resources comprised in the second and/or the first set and/or a total set of resources available for receiving downlink reference signals for positioning. In one example, the physical resources PAD are selected from the second set and having a strongest measured RSSI.

In one example, the (data indicative of) physical resources PAD comprise an antenna beam beam to choose for PRS signal transmission. One way of selecting the antenna beam is to consider the one beam with the strongest measured receives signal strength at the UE. It is understood that any radio characteristic can be used to select the physical resources.

In one alternative embodiment, the network node QQ160 then obtains the (data indicative of) physical resources PAD by transmitting a message S232, indicative of the second set of physical resources, to the location server LS. The location server LS then selects physical resources comprised in the second and/or the first set and/or a total set of resources available for receiving downlink reference signals for positioning and sends or transmits a message S322, indicative of the physical resources PAD for receiving the downlink reference signals for positioning $RS_a$-$RS_c$ to the network node QQ160. The network node QQ160 then transmits a message S212, to the user equipment QQ110, indicative of the physical resources PAD for receiving the downlink reference signals for positioning $RS_a$-$RS_c$ to the UE.

The UE then receives the message S212, from the network node QQ160, indicative of the physical resources PAD for receiving the downlink reference signals for positioning RSa-RSc and performs positioning measurements using the physical resources PAD for receiving the downlink reference signals for positioning $RS_a$-$RS_c$. The positioning measurements generate results PMR of the positioning measurements. The results may e.g. be any combination of any of CQI, RSRP, RSRQ and RSSI associated to corresponding physical resources.

In one embodiment, the UE QQ110 determines it's position using the results PMR of the positioning measurements.

In one alternative embodiment, the UE QQ110 sends or transmits a message S123, indicative of the results PMR of the positioning measurements, to the network node QQ160 for a determination of the position of the user equipment QQ110. The network node QQ160 then determines the position of the user equipment QQ110 based on the results PMR, or sends a message S233, indicative of the results PMR, to the location server LS for a determination of the position of the user equipment QQ110.

The determined position may then be sent to any node of the wireless network 300, e.g. the UE, the network node QQ160, the second network node or any network node communicatively coupled to the wireless network 300.

Figure 5:
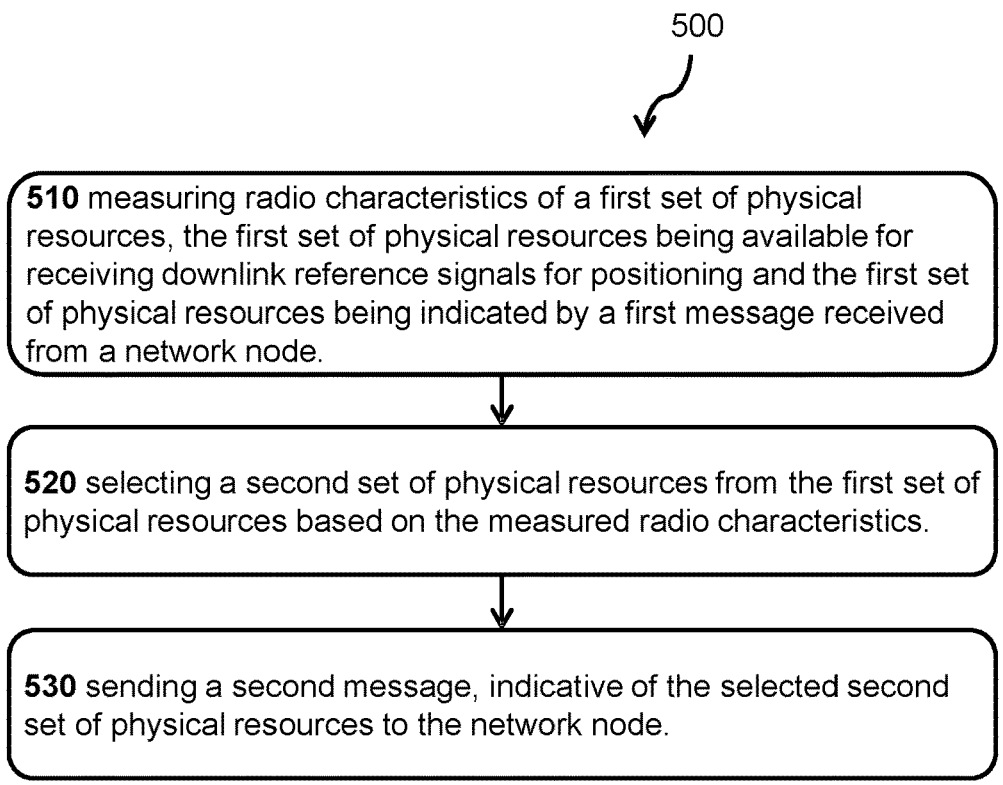
FIG. 5 shows a flowchart according to one or more embodiments of the present disclosure.

FIG. 5 shows a flowchart according to one or more embodiments of the present disclosure. A method is provided for operating a user equipment QQ110 in a wireless network is provided. The method comprises:

STEP 510: measuring radio characteristics of a first set of physical resources, the first set of physical resources being available for receiving downlink reference signals for positioning $RS_a$-$RS_A$ and the first set of physical resources being indicated by a first message S211 received from a network node QQ160.

The measurements generate physical measurement results PMR, which may e.g. be any combination of any of CQI, RSRP, RSRQ and RSSI associated to corresponding physical resources.

STEP 520: selecting a second set of physical resources from the first set of physical resources based on the measured radio characteristics, In one embodiment, the second set of physical resources are selected from the first set of physical resources by ranking the measured radio characteristics using predetermined conditions defining preferred radio characteristics. In one example, physical resources from the first set having the strongest measured RSSI, or highest ranked RSSI, are selected to the second set. The predetermined conditions may e.g. be defining preferred radio characteristics as any conditions based on any combination of any of CQI, RSRP, RSRQ and RSSI.

In one example, the predetermined conditions specify radio characteristics, e.g. RSRP/RSRQ/ . . . , above certain known and predefined threshold. The second set of physical resources, e.g. antenna beams, are selected from the first set of physical resources if they have or are associated to radio characteristics, e.g. RSRP/RSRQ/ . . . , above the certain known and predefined threshold.

STEP 530: sending a second message S122, indicative of the selected second set of physical resources to the network node QQ160. Sending a message may comprise sending a wireless signal comprising data indicative of the second set of physical resources.

In one embodiment, the method further comprises performing positioning measurements.

In one embodiment, the method further comprises:
receiving a third message S212, from the network node QQ160, indicative of physical resources PAD for receiving the downlink reference signals for positioning RSa-RSc, and
performing positioning measurements using the physical resources PAD for receiving the downlink reference signals for positioning RSa-RSc.

In one example, with reference to FIG. 3, the (data indicative of) physical resources PAD may be indicative of physical resources for receiving the downlink reference signals for positioning $RS_a$-$RS_c$. and the measurements may generate results as any of CQI, RSRP, RSRQ and RSSI.

In one embodiment, the UE further determines it's own position. In this embodiment, the method further comprises:
determining a position of the user equipment QQ110 using results PMR of the positioning measurements.

In one embodiment, the network node QQ160 or the location server LS determines the UE's position. In this embodiment, the UE sends a fourth message S123, indicative of the results PMR of the positioning measurements, to the network node QQ160 for a determination of the position of the user equipment QQ110.

Figure 6:
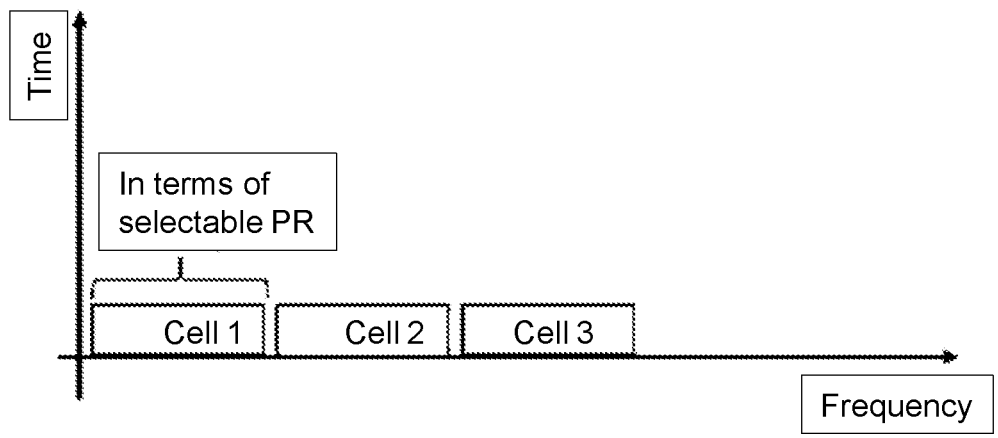
FIG. 6 illustrates mutually disjunctive physical resources according to one or more embodiments of the present disclosure.

FIG. 6 illustrates mutually disjunctive physical resources according to one or more embodiments of the present disclosure. In this embodiment, the physical resources or a subset of the physical resources allocated to network nodes QQ160$_a$-QQ160$_c$ to be used for positioning measurements are, entirely and/or in part, mutually disjunctive, e.g. separated in the frequency domain. In this embodiment, the physical resources, indicated by PAD, for receiving the downlink reference signals for positioning RSa-RSc of two or more network nodes QQ160a-QQ160c are mutually disjunctive.

In the example shown in FIG. 6, network node QQ160$_a$ may comprise Cell 1, network node QQ160$_b$ may comprise Cell 2 and network node QQ160$_c$ may comprise Cell 3. Cell 1 may receive PAD indicative of a first set of frequency resources, Cell 2 may receive PAD indicative of a second set of frequency resources and Cell 3 may receive PAD indicative of a third set of frequency resources, where the first, second and third set of frequency resources are mutually disjunctive.

In the example shown in FIG. 6, the frequency bandwidths or sets of frequency resources where the UE is experiencing a better channel conditions with the cells it has to perform TOA estimation are selected. In this example a frequency scheme selection from the UE is shown when the coherence-type-bandwidth of different cells do not overlap each other. Based on the UE selected frequency scheme equal bandwidth allocation for all cells to transmit positioning signal is shown, however depending on the UE experienced coherence-type-bandwidth and NR numerology, bandwidth allocation among cells might differ.

Figure 7:
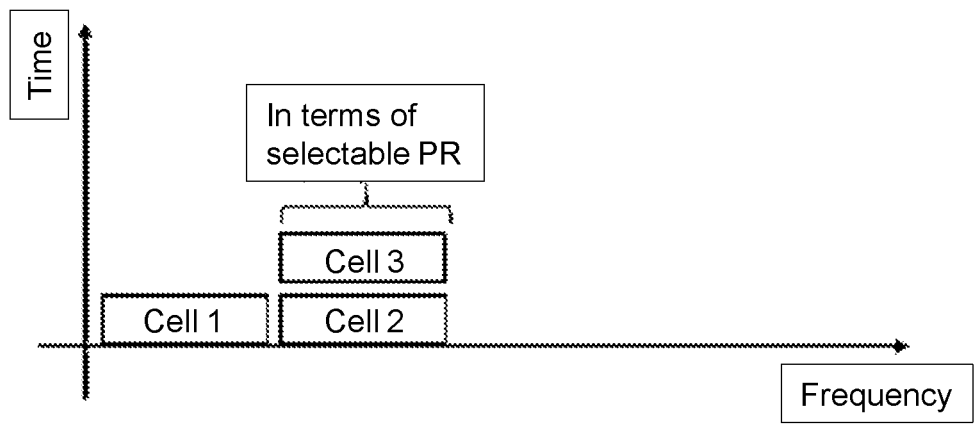
FIG. 7 illustrates mutually overlapping physical resources according to one or more embodiments of the present disclosure.

FIG. 7 illustrates mutually overlapping physical resources according to one or more embodiments of the present disclosure. In this embodiment, the physical resources or a subset of the physical resources allocated to network nodes QQ160$_a$-QQ160$_c$ to be used for positioning measurements are, entirely and/or in part, mutually overlapping, e.g. overlapping in the frequency domain. In this embodiment, the physical resources, indicated by PAD, for receiving the downlink reference signals for positioning RS$_a$-RS$_c$ of two or more network nodes QQ160$_a$-QQ160$_c$ are mutually overlapping.

In the example shown in FIG. 7, network node QQ160$_a$ may comprise Cell 1, network node QQ160$_b$ may comprise Cell 2 and network node QQ160$_c$ may comprise Cell 3. Cell 1 may receive PAD indicative of a first set of frequency resources, Cell 2 may receive PAD indicative of a second set of frequency resources and Cell 3 may receive PAD indicative of a third set of frequency resources, where the second and third set of frequency resources are mutually overlapping and mutually disjunctive to the first set of frequency resources.

In this situation when the UE reported a second set of frequency resources or bandwidths of different cells which overlap, the physical resources selection or frequency scheme selection will be as shown in FIG. 7. When the physical resources or frequency schemes are same for the two cells then the positioning signal transmission can be configured in a TDD manner. Two cells with same reported frequency scheme will configure their positioning signal transmission for the same frequency spectrum but transmit them in different time.

Figure 8:
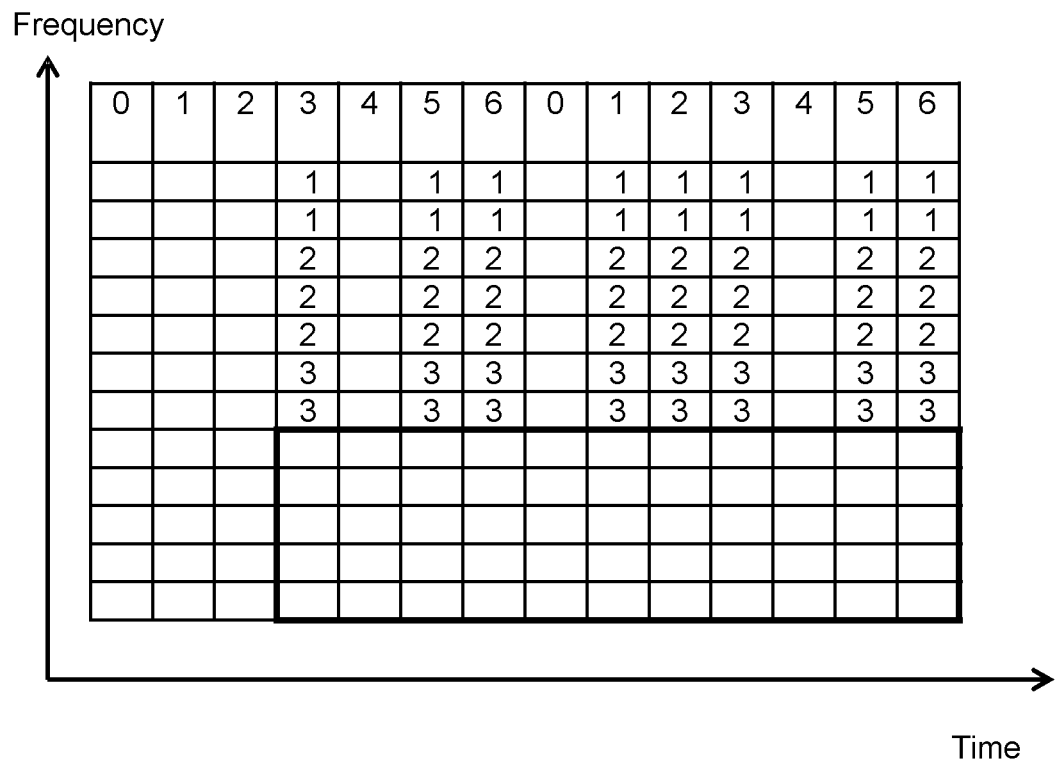
FIG. 8 illustrates details of mutually disjunctive physical resources according to one or more embodiments of the present disclosure.
Figure 9:
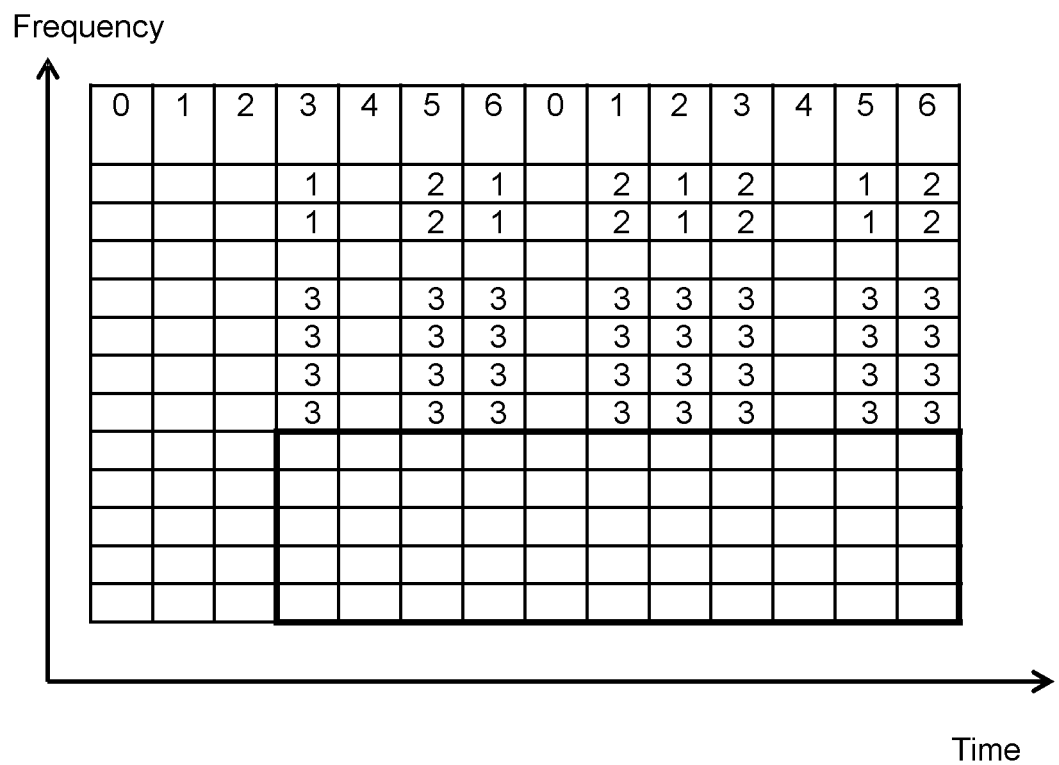
FIG. 9 illustrates details of mutually overlapping physical resources according to one or more embodiments of the present disclosure.

Moreover, a positioning signal configuration from the UEs perspective, when the positioning signal is allocated 1 PRB bandwidth (this allocation type can be seen as a typical bandwidth allocation for an NB-IoT UE) is shown in FIG. 8 and FIG. 9 addressing details of the situations in FIG. 6 and FIG. 7 respectively.

FIG. 8 illustrates details of mutually disjunctive physical resources according to one or more embodiments of the present disclosure. FIG. 8 shows a grid of time/frequency resources, where each square in the grid correspond to a physical resource block, PRB. With reference to FIG. 6, PRBs allocated to Cells 1-3 are identified by the corresponding numbers in the grid.

As can be seen from FIG. 8, the physical resources allocated to Cells 1-3 are mutually disjunctive.

FIG. 9 illustrates details of mutually overlapping physical resources according to one or more embodiments of the present disclosure. FIG. 8 shows a grid of time/frequency resources, where each square in the grid correspond to a physical resource block, PRB. With reference to FIG. 7, PRBs allocated to Cells 1-3 are identified by the corresponding numbers in the grid.

As can be seen from FIG. 9, the physical resources allocated to Cells 1-2 are mutually overlapping. At the same time, the physical resources allocated to Cells 1-2 are mutually disjunctive to the physical resources allocated to Cell 3. In particular, in the leftmost half of the grid, frequency resources are allocated to Cell 1 in time resources 3 and 6 are the same that are allocated to Cell 2 in time resource 5. In the rightmost half of the grid, frequency resources allocated to Cell 1 in time resources 2 and 5 are the same as frequency resources that are allocated to Cell 2 in time resources 1, 3 and 6.

Figure 10:
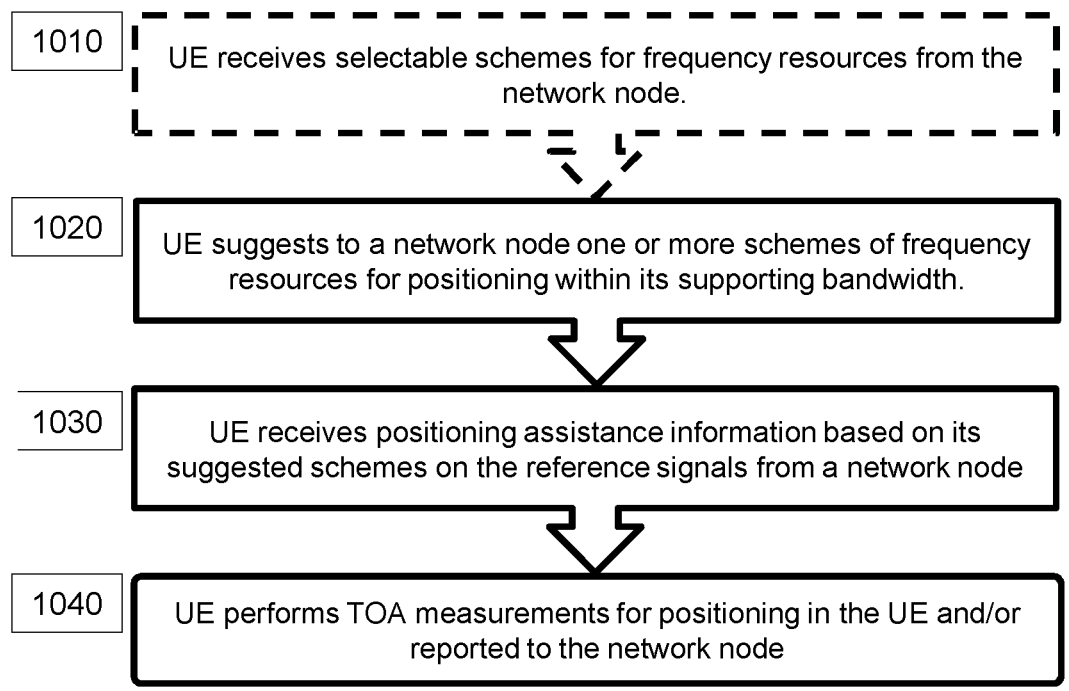
FIG. 10 illustrates a method performed by a user equipment according to one or more embodiments of the present disclosure.

FIG. 10 illustrates a method performed by a UE according to one or more embodiments of the present disclosure. FIG. 10 shows basic steps of the disclosure seen from the UE:s perspective. In an optional step 1010, the UE receives selectable schemes, e.g. the first set of physical resources, from the network node QQ160. In a following step 1020, the UE suggests to a network node QQ160 one or more physical resources or schemes in a second set of physical resources within the UEs supported bandwidth. In a step 1030, the UE receives positioning assistance information based on its suggested schemes on the reference symbols from the network node QQ160. In a following step 1040, the UE performs time of arrival, TOA, measurements for positioning in the UE and/or reported to the network node QQ160.

The basic steps of the invention are further described below:

(optional) steps 1010, 1110, 1210: The network node, which can be either the radio node QQ160 or the location server LS, provides selectable schemes of frequency resources or physical resources to the UE. Another option alternative to the above described signaled selectable schemes is to have a set of pre-defined schemes among which the UE could choose, e.g. stored in memory of the UE.

Steps 1010, 1110, 1210: A UE suggests to a network node one or more schemes of frequency resources for positioning within its supported bandwidth, e.g. described by frequency resources identities, size of the frequency resource range, etc. E.g. a number of PRBs and/or subcarriers and/or a range of PRB indexes and/or subcarriers and/or center of the frequency allocation and/or selected scheme index, etc.

If the UE has received selectable schemes from the network node before (i.e., in the optional step), then the suggested schemes are within the selectable schemes received from the network node.

During this procedure, the UE measures its channel link with the radio node QQ160. After estimating the channel, the UE calculates its delay spread and evaluates it coherence-type-bandwidth. Based on the enumerated channel estimation procedure, the UE identifies the best frequency resource scheme among the available ones, i.e. selects physical resources comprised in the second set, and reports it back to the network node QQ160. It should be noted here that the selectable frequency schemes or physical resources depend on the NR numerology. In the spectrum corresponding to the higher numerologies the UE reported coherence-type-bandwidth will be high. In contrast, in the spectrum corresponding to the lower numerologies, the UE measured coherence-type-bandwidth will be of value lower than what it would report for higher NR numerologies.

Steps 120, 1220: The network node either configures itself (if the network node is radio network node such as gNB) or instructs another network node (e.g., gNB) to configure positioning signals accordingly if the network node is a positioning node (e.g the location server LS), based on the suggested schemes or physical resources comprised in the second set, received from the UE.

During this procedure, the network node maps itself and configures, or instructs another network node to configure, positioning signals on the resource grid based on the UE selected frequency scheme or physical resources. A schematic representation of the positioning signal configuration is shown in the FIGS. 6,7,8 and 9. Unlike what has been done in conventional systems, the positioning signal is now adaptive to the channel condition and the UE bandwidth capability.

Steps 1020, 1230: The UE receives OTDOA assistance data or PAD, which is sent to the UE based on its suggested schemes, e.g. from the location server LS.

During this procedure, the UE is made aware of the assistance data for the RSTD or positioning measurements. The assistance data contains list of the cells for which the RSTD or positioning measurement is to be done and the spectral region where the cells will be configuring their positioning signal transmission.

Step 1030: The UE performs measurements. The measurements are used for positioning in the UE and/or reported to the network node QQ160/LS for positioning During this procedure the UE performs the TOA estimation or positioning measurements corresponding to all the cells QQ160$_a$-QQ160$_c$ included in the assistance data, e.g. PAD. The RSTD measurement is then done e.g. by using the estimated TOA. After the RSTD or positioning measurements, the UE may either perform the localization procedure or its own or can pass this information to the location server LS and location server can perform positioning of the UE.

In one embodiment, the above-mentioned procedure needs to be done periodically or every time when positioning operation needs to be performed.

Figure 11:
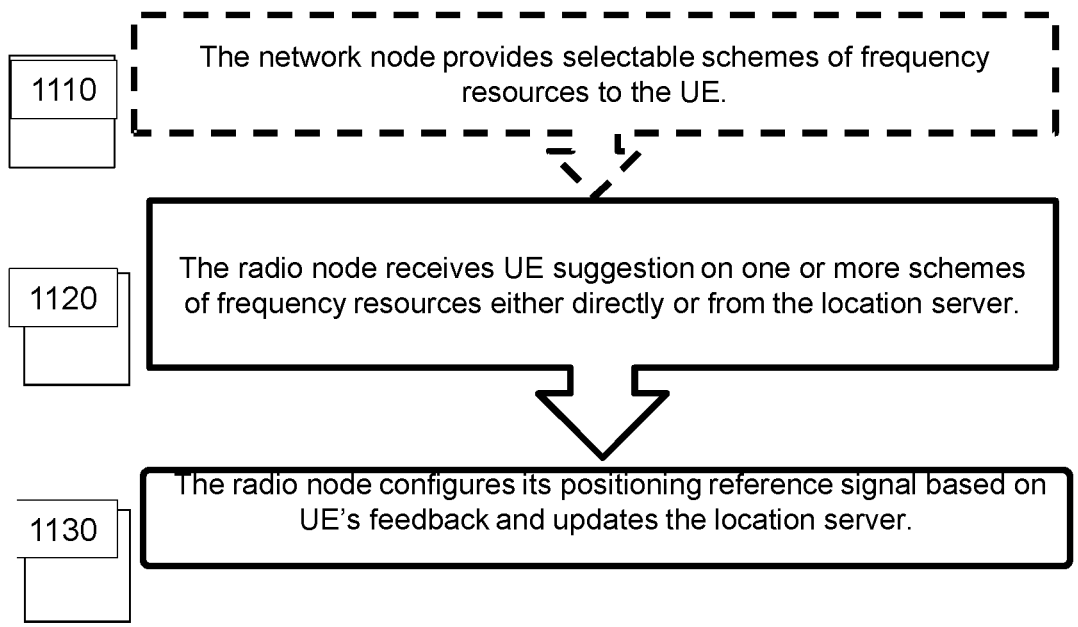
FIG. 11 illustrates a method performed by a network node QQ160 according to one or more embodiments of the present disclosure.

FIG. 11 illustrates a method performed by a network node QQ160 according to one or more embodiments of the present disclosure. FIG. 11 shows basic steps of the disclosure seen from the network node's QQ160 perspective. In an optional step 1110, the network node QQ160 provides selectable schemes, e.g. the first set of physical resources, to the UE. In a following step 1120, the network node QQ160 receives the one or more physical resources or schemes and/or frequency resources, comprised in a second set of physical resources, within the UEs supported bandwidth, either directly from the UE or from the location server. In a following step 1130, the radio node or network node QQ160 configures it's positioning reference signal based on the UE's feedback and updates the location server.

Figure 12:
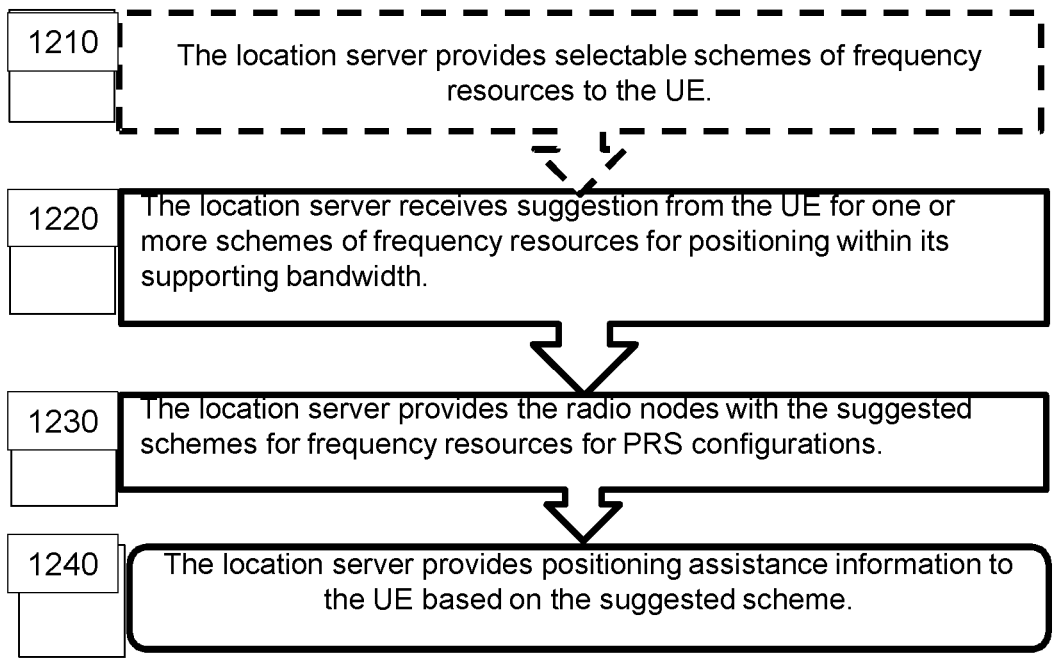
FIG. 12 illustrates a method performed by a location server LS according to one or more embodiments of the present disclosure.

FIG. 12 illustrates a method performed by a location server LS according to one or more embodiments of the present disclosure. FIG. 12 shows basic steps of the disclosure seen from the LS's perspective. In an optional step 1210, the LS provides selectable schemes or frequency resources, e.g. the first set of physical resources. In a following step 1220, the LS receives suggestion from the UE for one or more physical resources or schemes in a second set of physical resources for positioning within the UEs supported bandwidth. In a following step 1230, the LS provides the radio nodes QQ160$_a$-QQ160$_c$ with suggested one or more physical resources or schemes for reference symbol, e.g. PRS, configurations. In a following step 1240, the LS provides positioning assistance information to the UE based on it's suggested schemes.

Finally, it should be understood that the invention is not limited to the embodiments described above, but also relates to and incorporates all embodiments within the scope of the appended independent claims.

The invention claimed is:

1. A method for operating a user equipment in a wireless network, the method comprising:
   measuring radio characteristics of a first set of physical resources, the first set of physical resources being available for receiving downlink reference signals for positioning and the first set of physical resources being indicated by a message received from a network node of the wireless network;
   selecting a second set of physical resources from the first set of physical resources based on the measured radio characteristics;
   sending, to the network node, an indication of the selected second set of physical resources;
   in response to the indication of the selected second set, receiving from the network node an indication of physical resources for receiving the downlink reference signals for positioning; and
   performing positioning measurements using the indicated physical resources for receiving the downlink reference signals for positioning.

2. The method according to claim 1, further comprising one of the following:
   determining a position of the user equipment using results of the positioning measurements; or
   sending, to the network node, the results of the positioning measurements.

3. The method according to claim 1, wherein selecting the second set of physical resources from the first set of physical resources comprises ranking the measured radio characteristics using predetermined conditions defining preferred radio characteristics, wherein the selected second set of resources correspond to the highest ranked measured radio characteristics.

4. The method according to claim 1, wherein the indicated physical resources for receiving the downlink reference signals include two or more mutually disjunctive sets of physical resources for receiving the downlink reference signals for positioning from respective two or more network nodes.

5. The method according to claim 1, wherein the indicated physical resources for receiving the downlink reference signals include two or more mutually overlapping sets of physical resources for receiving the downlink reference signals for positioning from respective two or more network nodes.

6. A method for operating a network node in a wireless network, the method comprising:

receiving, from a user equipment or from a second network node, a request for physical resources selectable for positioning;

obtaining a first set of physical resources selectable for positioning measurements;

transmitting, to the user equipment, a message including an indication of the first set of physical resources;

receiving, from the user equipment, an indication of a second set of physical resources selected from the first set of physical resources;

based on the selected second set of physical resources, obtaining physical resources for receiving downlink reference signals for positioning; and transmitting, to the user equipment, an indication of the physical resources for receiving the downlink reference signals for positioning.

7. The method according to claim 6, wherein obtaining the first set of physical resources comprises:

transmitting, to a location server, a message indicative of the received request; and receiving, from the location server, the indication of the first set of physical resources.

8. The method according to claim 6, wherein obtaining the physical resources for receiving downlink reference signals comprises:

transmitting, to a location server, the indication of the second set of physical resources; and receiving, from the location server, the indication of the physical resources for receiving the downlink reference signals for positioning.

9. The method according to claim 6, further comprising:

receiving, from the user equipment, results of the positioning measurements; and one of the following:

determining the position of the user equipment based on the results; or sending the results to a location server for a determination of the position of the user equipment.

10. A user equipment configured for operation in a wireless network, the user equipment comprising:

a processor; and a memory storing instructions executable by said processor, wherein execution of the instructions configures the user equipment to:

measure radio characteristics of a first set of physical resources, the first set of physical resources being available for receiving downlink reference signals for positioning and the first set of physical resources being indicated by a message received from a network node of the wireless network;

select a second set of physical resources from the first set of physical resources based on the measured radio characteristics;

send, to the network node, an indication of the selected second set of physical resources;

in response to the indication of the selected second set, receive from the network node—an indication of physical resources for receiving the downlink reference signals for positioning; and perform positioning measurements using the indicated physical resources for receiving the downlink reference signals for positioning.

11. The user equipment according to claim 10, wherein execution of the instructions further configures the user equipment to perform one of the following:

determine a position of the user equipment using results of the positioning measurements; or send, to the network node, the results of the positioning measurements.

12. The user equipment according to claim 10, wherein execution of the instructions configures the user equipment to select the second set of physical resources from the first set of physical resources based on ranking the measured radio characteristics using predetermined conditions defining preferred radio characteristics, wherein the selected second set of resources correspond to the highest ranked measured radio characteristics.

13. The user equipment according to claim 10, wherein the indicated physical resources for receiving the downlink reference signals include two or more mutually disjunctive sets of physical resources for receiving the downlink reference signals for positioning from respective two or more network nodes.

14. The user equipment according to claim 10, wherein the indicated physical resources for receiving the downlink reference signals include two or more mutually overlapping sets of physical resources for receiving the downlink reference signals for positioning from respective two or more network nodes.

15. A network node configured for operation in a wireless network, the network node comprising:

a processor; and a memory storing instructions executable by said processor, wherein execution of the instructions configures the network node to perform operations corresponding to the method of claim 6.

16. The network node according to claim 15, wherein execution of the instructions further configures the network node to obtain the first set of physical resources based on:

transmitting, to a location server, a message indicative of the received request; and receiving, from the location server, the indication of the first set of physical resources.

17. The method according to claim 15, wherein execution of the instructions further configures the network node to obtain the physical resources for receiving downlink reference signals based on:

transmitting, to a location server, the indication of the second set of physical resources; and receiving, from the location server, the indication of the physical resources for receiving the downlink reference signals for positioning.

18. The network node according to claim 15, wherein execution of the instructions further configures the network node to:

receive, from the user equipment, results of the positioning measurements; and one of the following:

determine the position of the user equipment based on the results; or send the results to a location server for a determination of the position of the user equipment.

* * * * *